United States Patent

Spencer

[15] 3,701,955

[45] Oct. 31, 1972

[54] DELAY EQUALIZING AMPLIFIER HAVING BRIDGE CIRCUIT INPUT

[72] Inventor: John Gordon Spencer, Ottawa, Ontario, Canada

[73] Assignee: Northern Electric Company, Limited, Montreal, Quebec, Canada

[22] Filed: April 6, 1971

[21] Appl. No.: 131,674

[52] U.S. Cl. ......................330/21, 307/262, 330/13, 330/17, 330/28, 330/146, 333/28 R

[51] Int. Cl. ............................................H03f 1/42

[58] Field of Search .......333/28 R, 29 R, 74; 330/21, 330/31, 107, 109, 146, 185, 13, 17, 28; 307/232, 233, 262; 328/155

[56] References Cited

UNITED STATES PATENTS

| | | | |
|---|---|---|---|
| 2,611,873 | 9/1952 | Gager et al | 330/146 UX |
| 3,010,087 | 11/1961 | Ebbe et al. | 333/28 R |
| 2,615,999 | 10/1952 | Culicetto | 330/146 X |
| 2,891,158 | 6/1959 | Gabor | 333/29 X |
| 3,311,840 | 3/1967 | Gillard | 330/146 X |
| 3,436,671 | 4/1969 | Fenton et al. | 330/146 X |

*Primary Examiner*—Paul L. Gensler
*Attorney*—John E. Mowle

[57] ABSTRACT

A delay equalizer circuit with constant impedance input is constituted by a bridge having three resistive arms and a fourth arm consisting of a resonant circuit. One diagonal receives the input and the base and emitter of a transistor are connected across the other diagonal. Negative feedback causes the emitter to follow the base voltage closely.

The transistor furnishes an equalized output through its collector circuit which is well suited for coupling to transistor amplifying stages.

12 Claims, 10 Drawing Figures

INVENTOR
J.G. SPENCER

AGENT
John E Mowle

INVENTOR
J. G. SPENCER

AGENT
John E. Moule

INVENTOR
J. G. SPENCER

AGENT
John E Mowle

*INVENTOR*
J. G. SPENCER
AGENT
John E Mowle

DELAY EQUALIZING AMPLIFIER HAVING BRIDGE CIRCUIT INPUT

This invention relates to electric wave filters, in particular those which have a constant input impedance over a range of frequency and are adapted to provide equalization or compensation for signal envelope delay distortion. Still more particularly, the invention concerns delay distortion equalization filters utilizing the cooperation of one or more active elements and as such adapted to be constituted as part of the structure of an amplifier.

The increasing demand for transmission of pulse type signals for data communication over facilities originally provided for voice communication has created a demand for reducing the envelope delay distortion of electrical communication channels. Networks composed of passive impedance units are known which will compensate for the unequal transmission speed of the different frequencies used in a communication channel and thus mitigate envelope delay distortion. These networks have the disadvantage of requiring a considerable number of expensive components, particularly inductors which are bulky as well as expensive. It is an object of this invention to provide a network using only a single inductor and providing, in combination in an amplifier input circuit, delay distortion equalization, either without affecting the amplitude-frequency transmission characteristics, or, if desired, along with some amplitude equalization. It is a further object to provide an equalizer amplifier in a form which will have a constant input impedance and also a constant output impedance over the transmission band for which it is designed to be used.

The amplifying delay equalizer of this invention uses a bridge type input circuit with one reactive and three resistive arms, with the input applied to one diagonal and with the other diagonal connected to the input electrodes of an amplifying element which abstracts at most a negligible amount of current across the last-mentioned diagonal of the bridge, but which abstracts or contributes a significant amount of current across one arm of the bridge. The amplifying element may, for example, be a transistor with base and emitter connected to the bridge, from the collector circuit of which transistor a delay equalized signal may be taken. Feedback around this and succeeding amplification stages can further improve the operation of the circuit.

In the drawings, which illustrate an embodiment of the invention:

Figure 1:
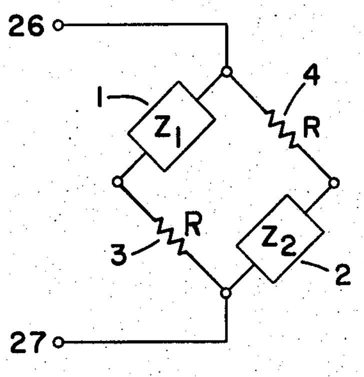
FIG. 1 is a diagram of a constant impedance network the input impedance of which the equalizer amplifier of this invention approximates for its input impedance.

FIG. 1 shows a bridge type network having reactive arms 1 and 2 for one pair of opposite sides and resistive arms 3 and 4 for the other pair. If the resistances of the arms 3 and 4 are equal and in each case denoted by R, and if we denote the impedance of arm 1 by $Z_1$ and the impedance of arm 2 by $Z_2$, the condition that the network, as seen from any pair of opposite corners, should have an impedance which is constant with frequency is given by the equation $Z_1Z_2 = R^2$ and the impedance in that case is equal to R. For this condition to hold, $Z_1$ and $Z_2$, if they are to have non-zero reactance, obviously cannot be identical. In general, if one of these is inductive the other must be capacitive.

It is difficult to use the network of FIG. 1 as a constant impedance phase shifting network, because the bridge will be balanced if the impedances meet the conditions for a constant input impedance which is to say that if input is provided across one diagonal, there will be no output across the other. I have found that the circuit configuration of FIG. 2 can provide the same constant input impedance characteristic that the network of FIG. 1 possesses and at the same time provide an output signal with a phase shift that increases with frequency in a manner desired for delay equalization.

Figure 2:
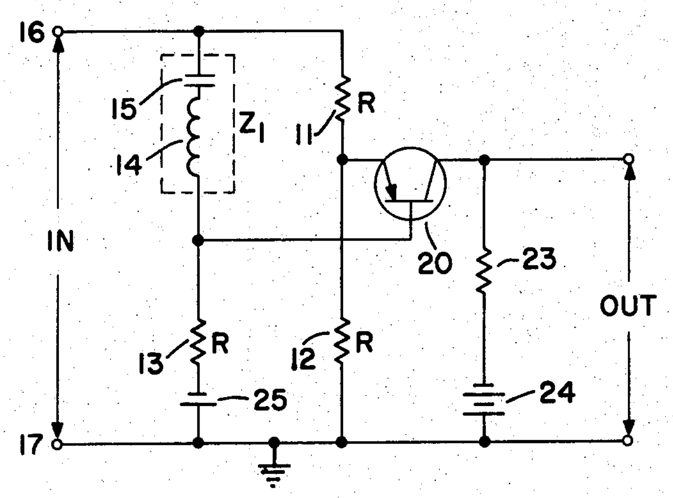
FIG. 2 is a simplified diagram of an equalizing amplifier according to this invention.

In FIG. 2, there is a bridge of which 3 arms 11, 12 and 13 are resistive and have the same resistance R, and the fourth arm of which is a series resonant circuit composed of the inductance 14 and the capacitance 15. The batteries 24 and 25 may be regarded as short circuits for alternating current. Input connections are shown at 16 and 17, connected respectively to the junction of resistor 11 and capacitor 15 and the junction of resistors 12 and 13. A transistor 20 has its emitter connected to the junction of resistors 11 and 12 and its base connected to the junction of resistor 13 and inductor 14. Its collector is connected through a load resistor 23 and battery 24 to the grounded corner of the bridge, which is the junction of resistors 12 and 13. The output appears between the collector of transistor 20 and ground. We may assume, for consideration of the transmission properties of the circuit, that the transistor 20 is an ideal transistor, which is to say that there is no base current, that the emitter-collector current is of such magnitude that the emitter voltage exactly follows the base voltage and that variations in collector voltage do not cause collector current to vary. The bridge is brought into balance as a result of resistor 23 being required to carry the collector circuit current of transistor 20 as well as current derived from the input.

Since the bridge is balanced by transistor action, and since the left hand arms are the same as arms 1 and 3 of FIG. 1, the current in resistor 11 must be the same as the current that flows in resistive arm 4 of FIG. 1 when the same input is applied across input terminals 26 and 27 of FIG. 1. In the case of an ideal transistor, therefore, the input impedance of the circuit of FIG. 2 is like the impedance of the network of FIG. 1 between input terminals 26 and 27, which is to say, that the impedance does not change with frequency. Practical transistors permit a close approach to this behavior.

Figure 3:
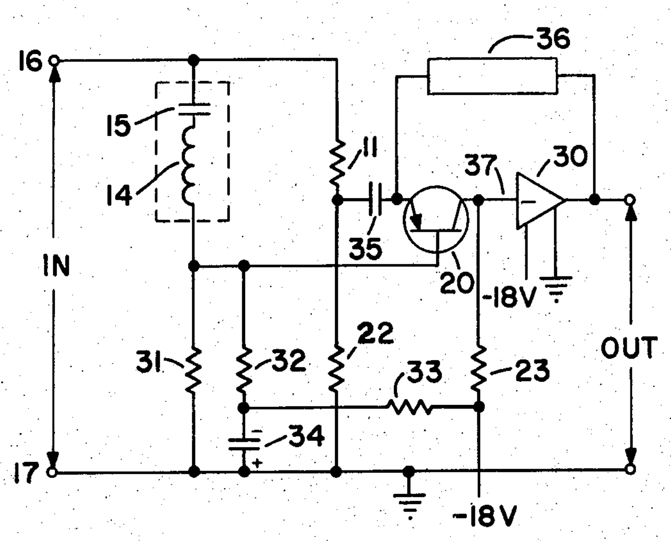
FIG. 3 is a partly simplified diagram of an embodiment of this invention.

FIG. 3 shows a development of the circuit of FIG. 2, with the addition of means to derive the d.c. bias for the base of the transistor from the main power supply and with provision of feedback 36 around both the transistor connected to the input bridge circuit and also some succeeding stages of amplification, shown by the general indication of the amplifier 30. The input bridge circuit in FIG. 3 is the same as that of FIG. 2 except that instead of resistor 13 there are resistors 31 and 32. Resistors 31 and 32 operate in series along with a third resistor 33 as a voltage divider to set the no-signal voltage of the base of transistor 20 while the by-pass capacitor 34 acts like a short circuit for the signal frequencies, with the result that for signal frequencies resistors 31 and 32, but not resistor 33, are effectively in parallel and this combination of resistors 31 and 32 is equivalent to resistor 13 of FIG. 1. Another capacitor 35 is provided for d.c. blocking between the emitter of transistor 20 and the junction of resistors 11 and 22, in order that the d.c. level of the emitter may set the d.c. midpoint of the output stage under feedback control, as more particularly explained with regard to FIG. 4. The feedback provided by network 36 assures that the amplification provided by transistor 20 and amplifier 30 will have no substantial variation of gain with frequency across the band of frequencies for which the amplifier is designed.

The feedback network 36 provides an emitter-to-ground path for transistor 20 and the resistance in that path, in parallel at signal frequencies with resistor 22, must be taken into account in determining the magnitude of the latter, so that the parallel combination will have the resistance desired for the bridge circuit, corresponding to the resistance of resistor 12 in FIG. 2. Stated more broadly, resistor 22 should preferably be of somewhat higher value than R, the desired input impedance, to allow for the less than infinite source impedance of the feedback current provided by network 36. For example if network 36 consists of a simple resistor, high in value compared with the output impedance of amplifier 30; then resistor 22 in parallel with that simple resistor should preferably be equal to R. It is mentioned in passing that if the said source impedance is arranged to be equal to R, then resistor 22 may be replaced by an open circuit. On these assumptions, the current to balance the bridge abstracted or contributed where the emitter of transistor 20 connects to the bridge is the same (for a given input) in FIGS. 2 and 3. However, in FIG. 3 only a small part of said current is the emitter current of transistor 20; the remainder being feedback current supplied by network 36. The reduction of emitter current reduces the emitter-to-base drop and allows the desired condition of bridge balance to be more closely approached. Furthermore, said reduction of emitter current tends to reduce the base current so that the desired condition of abstracting no current from the junction of inductor 14 and emitters 31 and 32 in FIG. 3 may be approached more closely. According to design details such as the value of resistor 23, application of feedback may or may not reduce the alternating voltage between collector and base of transistor 20. When said alternating voltage is reduced, there is a second cause tending to reduce the unwanted base current.

In order to meet the polarity requirements without unacceptable complication of network 36, amplifier 30 must be an inverting amplifier, that is to say that it must provide a negative going output for a positive going input. This condition is designated by the minus sign near the input connection 37 to amplifier 30.

Figure 4:
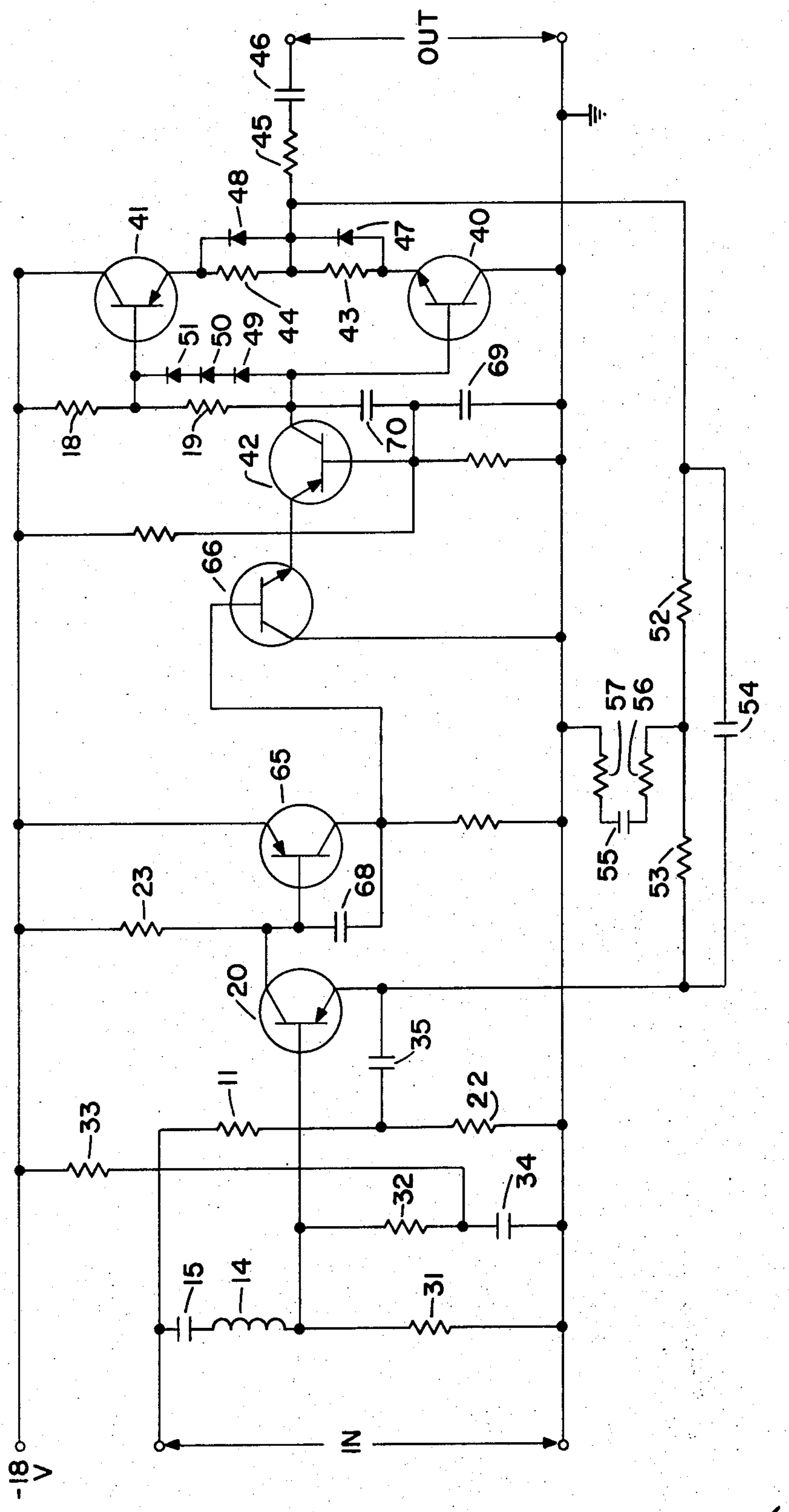
FIG. 4 is a circuit diagram of an embodiment of this invention.

FIG. 4 shows an illustrative specific form of the circuit of FIG. 3 in which the amplifier 30 of FIG. 3 takes the form of an amplifier containing five transistors, two of which are a pair of complementary transistors in a well known class B output circuit. This type of amplifier is suitable for providing a substantially flat amplitude frequency response from 200 to 3400 Herz at a power level up to about 30 milliwatts.

In FIG. 4, the output transistors 40 and 41 have their bases driven in parallel by driver transistor 42 and their emitter collector current paths are in series through resistors 43 and 44. Because transistors 40 and 41 are of complementary types, an input voltage change which reduces the conductivity of transistor 40 increases the conductivity of transistor 41. Consequently, the junction of resistors 43 and 44, where the output is taken off, will be swung up and down by the joint action of both transistors. This type of output circuit provides a low output impedance.

Resistor 45 has a value of 130 ohms, and builds out the amplifier output impedance to about this value. Capacitor 46 which has a value of 39 microfarads blocks d.c. The amplifier is designed to work into an impedance of about 170 ohms. Resistors 18 and 19 which each have a value of 510 ohms and diodes 47, 48, 49, 50, and 51 provide an arrangement which will minimize so-called "cross-over distortion" to which class B amplifiers tend to be subject at low amplitude levels.

The d.c. level of the mid-point of resistors 43 and 44, which is roughly mid-way between ground and the negative pole of the energizing power supply, is set by the connection to the emitter of transistor 20, through resistors 52 and 53 of the feedback network which have values of 2000 and 36,000 ohms respectively. Resistor 53 by virtue of blocking capacitors 35 and 55 is at signal frequencies in parallel with resistor 22 and is hence responsible for an increase in the magnitude of the latter over the resistance desired for the bridge arm in question. Capacitor 54 across the series combination of resistors 52 and 53 is very small, preferably 1-½ picofarads, and is designed to control the loop gain at frequencies well above the signal band. Resistors 52 and 53 form the two series arms of a T network providing a.c. feedback. The shunt arm of this network contains the blocking capacitor 55 which must have a very high value, preferably 68 microfarads. Resistors 56 and 57 of the shunt arm of the T have values of 500 and 51 ohms respectively and resistor 56 is preferably variable to provide gain control.

As in the case of FIG. 3, the d.c. level of the base of transistor 20 is determined by a voltage divider, of which two resistances, shown at 31 and 32, are effectively in parallel for frequencies in the transmission band, on account of the presence of by-pass capacitor 34, while a third resistance 33 is external to the input bridge circuit. Only a small current is needed for this voltage divider, so that resistances 33 and 31 are conveniently made large, in this case 100,000 and 150,000 ohms, respectively, while resistance 32 is only slightly larger than resistance 11. Thus, resistor 32 may desirably have a resistance of 6800 ohms when resistor 11 has a resistance of 6500 ohms, so that the combination of resistors 31 and 32 will have an effective resistance for audio frequencies of 6500 ohms (exact calculated values are treated in the next paragraph). The magnitude of resistor 33 is determined to bring the no-signal voltage of the base of transistor 20 to the proper working voltage, such that the no-signal voltage of the junction of resistors 43 and 44 will be half the supply voltage, as desired for the class B output stage.

The exact nominal value of resistors 11, 31 and 32 are 6490, 6810 and 150,000 ohms respectively. Thus, the nominal value of resistors 31 and 32 in parallel (6514 ohms) differs slightly from that of resistor 11 (6490 ohms). While possibly swamped in practice by resistor tolerances, the difference is intentional to compensate for a small alternating voltage drop between emitter and base of transistor 20 in spite of the feedback. It is calculated that an effective emitter resistance of 12 ohms has been so compensated. (Transistor 20 carries only some 30 microamperes direct emitter current and therefore has some 800 ohms emitter resistance. Feedback however reduces the effective emitter resistance to at most a few tens of ohms.) To complete the bridge with compensation for 12 ohms effective emitter resistance would require resistor 22 optimally about 7900 ohms, so that resistor 22 in parallel with some 36,200 ohms representing the source impedance of the feedback network (largely resistor 53) would be 6490 ohms, equal to the value of resistor 11. A constant input impedance of nominally 6502 ohms is calculated, which is in between the value of resistor 11 and that of the combination of resistors 31 and 32.

However, the upper left-hand arm of the bridge circuit, containing inductor 14 and capacitor 15 cannot in practice be purely reactive, principally because of the resistance of the wire of inductor 14. In this particular case inductor 14 is constructed using a gapped ferrite "pot" core and has an inductance of 636 millihenrys and a d.c. resistance of 115 ohms. (Capacitor 15 has a value of 8130 picofarads.) It may be shown that the resistance of inductor 14 may be compensated by reducing the value of resistor 22. The calculated optimal value of resistor 22, to compensate for 115 ohms inductor resistance is 7620 ohms rather than 7900 ohms without such compensation. In practice nominally 7680 ohms is employed and excellent flatness of the overall gain-frequency curve is obtained, slightly better than when the calculated 7620 ohms is employed.

These fine adjustments do not produce more than a slight disparity in the effective resistance of the three resistive bridge arms. Their purpose is to make the bridge behave as if it had a lossless reactive arm, equal resistive arms and an active device across its output diagonal having properties of an ideal transistor as previously defined.

In the circuit of FIG. 4, the load resistor 23 of transistor 20 has a value of 22,000 ohms. The stages of amplification between transistor 20 and the previously described output stage utilizes transistor 65 in a common emitter circuit, driving the base of transistor 66. The latter operates with grounded collector and with its emitter in series with the emitter-collector path of a complementary type of transistor shown at 42. This last operates in the common base mode to drive the output pair of transistors 40 and 41 as previously described.

Transistor 65 has a small feedback capacitor 68 with the value of 3.3 picrofarads. Capacitor 69 is an audio bypass condenser between ground and the base of transistor 42 and may conveniently have a value of 3.9 microfarads. Capacitor 70, which may conveniently have the value of 390 picofarads causes a steady reduction in forward gain above about 4 kHz, ensuring overall high frequency stability in conjunction with capacitors 54 and 68 (already mentioned). If desired the circuit of transistor 42 may be provided further high frequency stability by inserting a resistor (not shown) of a low value, such as 22 ohms, between capacitor 69 and ground. Some grounded-base amplifiers have a tendency to oscillate at high frequency if the base is connected to ground through a very low impedance.

Figure 5:
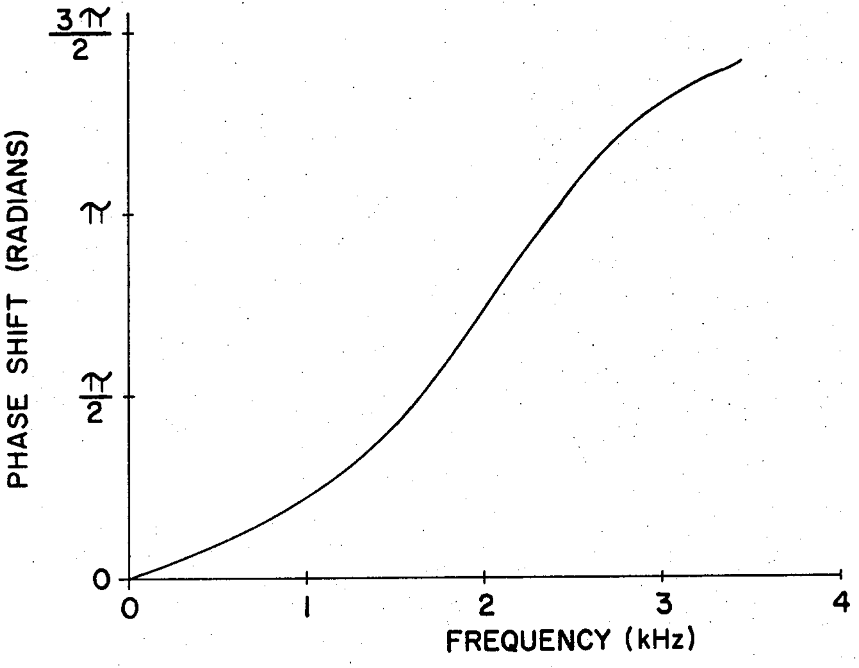
FIGS. 5 and 6 are graphs showing the operating characteristics of the embodiment diagrammed in FIG. 4.
Figure 6:
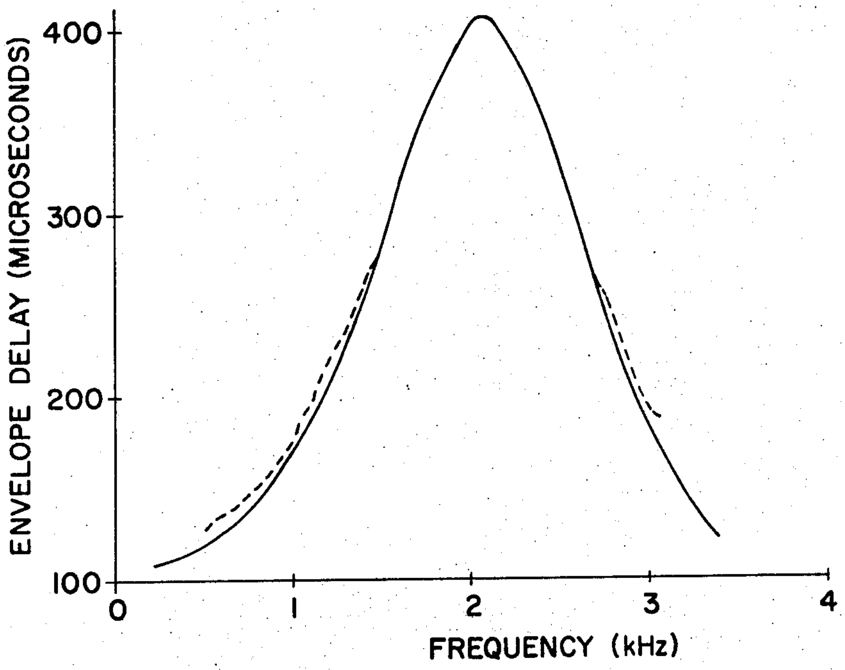

If transistor 20 were ideal except for the 12 ohms effective emitter resistance already discussed and if the inductor resistance is properly compensated in resistor 12, the phase shift in radians is given by the expression:

$$\pi + 2 \tan^{-1} X/R$$

where X is the reactance provided by inductor 14 and capacitor 15 at the frequency in question and R is the sum of the inductor resistance and the resistance of resistors 31 and 32 in parallel, which in the case above-mentioned works out to 6629 ohms. FIG. 5 shows the dependence of the phase shift given by the above expression against frequency as in FIG. 4, where the inductance is 636 mH and the capacitance 8130 pf. The envelope delay is defined as the rate of change of phase shift with respect to frequency and is obtained in microseconds if frequency is expressed in megaradians per second. FIG. 6 shows the envelope delay calculated to correspond with the above formula for the phase shift and also shows, in dotted lines, the envelope delay actually measured with the amplifier of FIG. 4, showing that the phase shift and delay equalization characteristics of the equalizer-amplifier of FIG. 4 are in effect substantially those expected. The phase and envelope delay characteristics shown in FIGS. 5 and 6 as well as the amplitude response of the FIG. 4 circuit, correspond to those of a constant resistance lattice network terminated in an impedance R and having purely reactive arms, one pair of arms of the reactance X and the other pair of the reactance $$-R^2/X.$$

Circuits capable of functioning according to the invention are not limited to circuits using a single transistor with its base-emitter or gate-source path connected across a diagonal of the input bridge designed according to the invention. Instead of a single transistor 20, another type of amplifying element or device capable of making the junction of resistors 11 and 12 follow the voltage which exists at the junction of inductor 14 and resistance 13 (FIG. 2) could be used. For example, a differential amplifier with a pair of input transistors could be used, in which case it would be important to provide the feedback to the side of the differential amplifier connected to the junction of resistors 11 and 12. The other connection would require a less desirable impedance of $R/2 + jX$ in the reactive arm, as discussed further below.

It is interesting to consider the effect of changing the value of resistance 12 (FIG. 2) while leaving the other elements of the input bridge circuit the same. As previously pointed out some decrease in the value of resistor 12, or resistor 22 (FIG. 4), can compensate for the presence of resistance in the inductor 14. Moderate change in the value of resistor 12 has little effect on the delay characteristics of the circuit but does introduce a change in the relative amplification with respect to frequency.

It is also interesting to consider the use of a shunt resonant circuit in the upper left-hand arm of the input bridge instead of the series resonant circuit shown in FIG. 4. It can be shown that, except for a reversal in the direction ("sign") of the output current, the result is the same as for the correspond-ing series resonant circuit. A shunt resonant circuit is much more difficult to use in this context, however, when the problem of compensating for the effect of losses in the inductor comes into play. An additional blocking capacitor may also be required and low frequency stability may sometimes be difficult to achieve. The series resonant circuit is therefore preferable whenever the desired reactance characteristics can be obtained in such a circuit with components of practical sizes.

Figure 7:
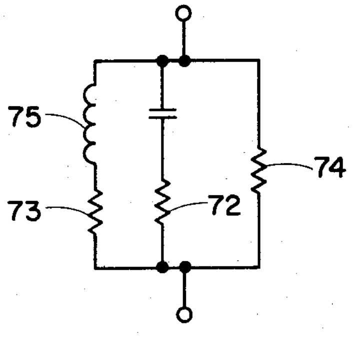
FIGS. 7 and 8 are diagrams of shunt resonant circuits of types usable in an embodiment of the invention.

If a shunt resonant circuit is used as just discussed, then in order to be able to compensate for the presence of losses in the inductor by change in the value of resistor 12, it may be necessary to introduce a resistor in association with the shunt resonant circuit as shown in FIG. 7, where 72 is an added resistor and 73 and 74 represent inherent series and shunt losses of the inductor, which has the inductance shown at 75. Added resistor 72 should be equal to resistance 73, which may be almost entirely the d.c. resistance of the wire of the coil. The corrected value of resistance 12 and of the inductance and the capacitance to be used are determined by analysis of the equivalent circuit for audio frequency in the conventional way and calculation by a method of successive approximations.

Figure 8:
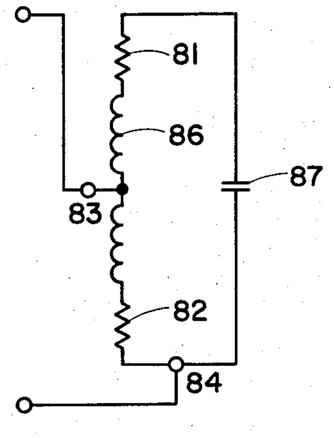
Figure 9:
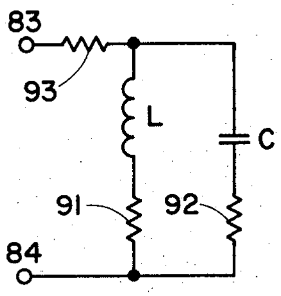
FIG. 9 is a diagram of a circuit equivalent under certain conditions to the circuit shown in FIG. 8.

In some cases a more efficient solution can be found by using a tapped coil for inductor of the shunt resonant circuit in the form shown in FIG. 8. Resistances 81 and 82 shown in series with the ends of the coil represent the d.c. resistance of the wire of the respective portions of the inductor above and below the tap 83. The circuit connecting points 83 and 84 shown in FIG. 8 has a theoretical equivalent shown in FIG. 9 such that the correspondence between them is as follows: if the inductance in FIG. 9 is L and the capacitance in FIG. 9 is C, then the inductance of the total coil 86 of FIG. 8 is $n^2$L, where n is the turns ratio of the autotransformer constituted by the tapped coil, while capacitance 87 of FIG. 8 will have the value $C/n^2$. Consideration of the relation of the resistances 81 and 82 in FIG. 8 to the corresponding resistances 91 and 92 in FIG. 9 leads to the determination that if we call $r_1$ the value of resistance 81 and $r_2$ the value of resistance 82, it is desirable that $$r_1/r_2=2n-1$$

in order that resistances 91 and 92 may be equal.

The relation just given leads to the recommendation that the portion of the inductor 86 between tap 83 and the extremity connected to point 84 should be the inner winding and should be wound with thicker wire. I find that a design near optimum with respect to losses at the resonant frequency (which is the frequency at which the losses are most likely to be troublesome) may be obtained where n is approximately 8 and where the thicker winding is as near as practically convenient to 1.54 times greater in diameter than the remaining winding. These figures are for an inductor shape such that the length of the outermost turn is about double that of the innermost, but of course that condition does not have to apply exactly. Some improvement over other methods of compensating for the wire resistance of a shunt resonant circuit is obtained with a tapped coil having a value of n between about 4 and 8. A further refinement, which takes into account that the resistance of both parts of the coil vary with temperature and do so in the same manner, suggests that for a flat amplitude frequency characteristic over a range of temperature, the following additional requirement is desireable:

$$n=(2R^2C)/L$$

The two winding resistances 81 and 82 in FIG. 8 are represented in the equivalent circuit shown in FIG. 9 by the three resistances 91, 92 and 93. Analysis show that, provided resistances 91 and 92 are equal, the presence of resistance 93 as well as of resistances 91 and 92 may be compensated by an appropriate choice for the value of resistance 22, and a flat amplitude/frequency characteristic obtained.

When a tapped coil is employed, and coil losses other than d.c. resistance are appreciable, the equivalent circuit of FIG. 9 may be refined by the addition of a resistance (not shown) of high value between points 83 and 84. Core loss, for example, may be approximately represented partly by said resistance of high value and partly by an increase of resistance 91 and a smaller decrease of resistance 93. Resistances 91 and 92 should still optimally be equal, so $$r_1/r_2=2n-1$$

is no longer the most desirable relationship when resistances 91 and 92 are equal, however, the presence of resistances 91, 92, 93 and the said resistance of high value may be compensated by appropriate choice of resistance 22, at least to a good approximation.

As mentioned before, however, in most cases, the series resonant circuit will be found more efficient or economical than the shunt resonant circuit in a delay equalization amplifier input circuit according to the invention.

Figure 10:
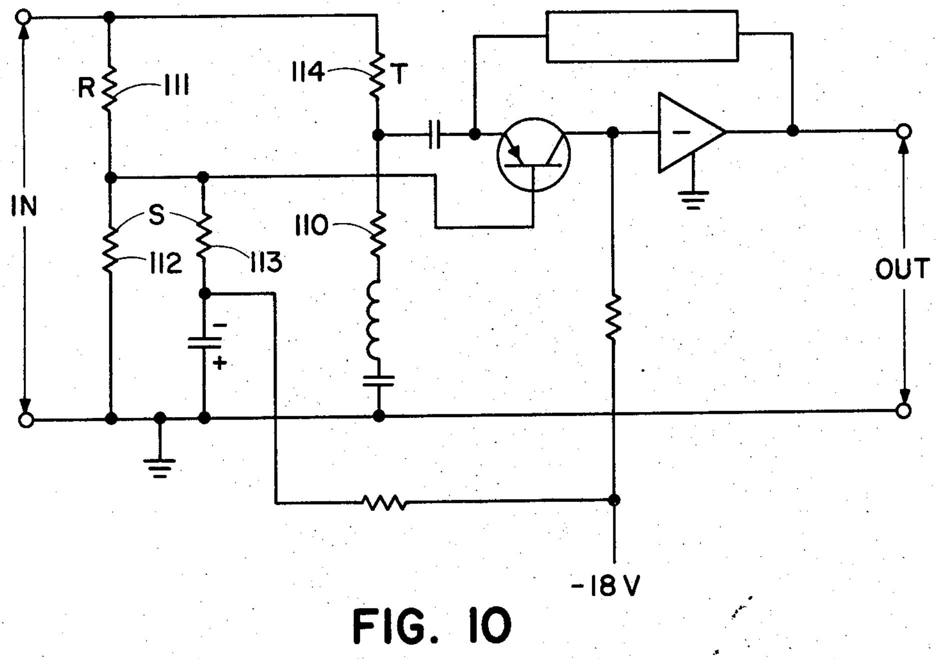
FIG. 10 is a simplified diagram of another kind of equalizing amplifier according to the invention.

For a complete understanding of the invention it is also interesting to consider the behavior of a circuit such as FIG. 3 or FIG. 4 in which the input bridge is modified so that the left-hand arms are both resistive and in which the resistance 22 is replaced by a reactive arm. A simplified diagram of this configuration, using the simplifications utilized in FIG. 3, is shown in FIG. 10. This configuration can provide a phase shift suitable for delay equalization, but in this case P, the value of the total effective resistance in the bridge arm in question is not to be minimized but is to be made to approach a desired finite value. Assuming first that the resistors 111 and 114 and the parallel combination of resistors 112 and 113 each have resistance equal to R, it turns out that a delay equalization circuit is feasible if impedance of the lower right-hand arm is $R/2 + jX$, which is to say that $P = R/2$. The resistive arms of the bridge in the configuration of FIG. 10 do not need to be even approximately equal to produce the phase-shift characteristic desired. If we identify their resistances as R, S and T, the resistance is $P = ST/2R$. This last formula, furthermore, assumes that the shunt impedance of the amplifier input (largely resistance 53 in FIG. 4) is finite. If it is finite and denoted by U, the formula for P becomes $$P=\frac{ST}{2R}\cdot\frac{1}{1-\frac{ST}{RU}}$$

. The input impedance of the circuit is $$\frac{R+S}{1+\frac{R}{T}}$$

(which reduces to R if S and T are both equal to R). P, of course, is the resistance of the parallel combination of resistance 110 (which includes inductor wire resistance) and the impedance of the source of feedback current.

The configuration of FIG. 10 like that of FIGS. 2–4 comprises a bridge having a first pair of arms across the input connection, both of which are resistive, and having a second pair of arms, one of which is a resonant circuit and the other of which is essentially resistive. Viewed in this way, FIG. 10 differs from FIG. 3 in that:

i. base and emitter connections to the bridge are interchanged, ii. the resonant circuit is in a grounded rather than an ungrounded bridge arm, and iii. the resonant circuit is optimally not low loss, but one with controlled series resistance.

Since both FIG. 10 and FIG. 3 provide phase shift circuits for delay equalization derived from the properties of FIG. 1, by the substitution of a resistive arm for one of the reactive arms of FIG. 1 and the use of an active device to bring the bridge nevertheless into closely approximate balance, both of these circuit types are part of the present invention. The configuration of FIG. 3 is at present preferred and the invention has been illustrated principally with reference thereto for that reason.

In the above descriptions, the terms "feedback" and "feedback current" have been applied to the overall feedback around multistage amplifiers. However, the emitter current of transistor 20 may also be considered a local feedback current.

In connection with FIG. 3 it was mentioned in passing that "if said source impedance is arranged to be equal to R, then resistor 22 may be replaced by an open circuit." This shows that not only must the impedance of the feedback current source be considered as an impedance in parallel with the resistance in a bridge arm, but in this limiting case the entire bridge arm might be that source impedance.

The phase shifting circuits of this invention, whether used for delay equalization or otherwise, not only use a smaller number of inductors than the well-known lattice filters providing comparable characteristics but also in general use a smaller number than "half lattice" and "bridged T" arrangements that are sometimes employed. Furthermore, those passive filter circuits generally require at least two kinds of reactive arms differing in impedance and so are limited to cases where both of these different impedances are practically realizable. For filters of the present invention, it is necessary that only one of the impedances in question be realizable as a physical arm of the bridge.

What is claimed is:

1. An amplifier input circuit having envelope delay equalization capability with respect to an associated transmission facility comprising:

a. a bridge having a ground terminal and an input terminal for connection of the transmission facility thereacross, a first pair of arms connected in series between the input terminal and the ground terminal, both of which arms are resistive, a second pair of arms, likewise connected in series between the input terminal and the ground terminal, one arm of which contains a resonant circuit connected to the input terminal and the other arm of which is essentially resistive, b. a solid state device capable of providing amplification having first and second input electrodes and an output electrode, the first input electrode connected to the junction between the arms of the first pair, the second input electrode connected to the junction between the arms of the second pair, the solid state device characterized in that in operation the magnitude and direction of current flowing at the output electrode is substantially the same as that flowing at the first input electrode and in proportion to a voltage applied to the second input electrode, c. a resistor connected between the output electrode and a voltage source, d. the circuit being arranged so that when alternating signals are applied from said transmission facility across the input and ground terminals of the bridge said device causes a current to flow in one arm of said bridge to keep said bridge approximately balanced and thereby generates a delay equalized current at said output electrode and causes the terminals of said bridge to present an input impedance to said transmission facilities which is substantially constant over a transmission band of frequencies.

2. An amplifier input circuit as defined in claim 1 in which the resistive arm of said second pair of arms is approximately equal in resistance to the opposite arm of said first pair of arms and in which said resonant circuit is a series resonant circuit.

3. An amplifier input circuit as defined in claim 2 in which the said device is a transistor having an emitter, a base and a collector corresponding to the first and second input electrodes and the output electrode respectively.

4. A circuit as defined in claim 1 in which said resonant circuit is shunt resonant, in which the opposite resistive arms of said bridge have approximately equal resistivity.

5. A circuit as defined in claim 4 in which a resistor is added in series with the capacitive branch of said shunt resonant circuit approximately equal to the direct current resistance of the inductive branch of said shunt resonant circuit.

6. A circuit as defined in claim 4 in which said shunt resonant circuit contains a tapped inductor having windings differing in resistivity per unit length on either side of the tap of said inductor, in which the portion with the smaller number of turns and the lower resistivity wire is connected in parallel with the serially connected combination of the other portion and the capacitive branch of said shunt circuit, such that the one portion is connected directly between the input terminal and said arm which is essentially resistive, and in which the relative resistivity of the portions of said inductor on either side of said tap are approximately in the ratio $r_1/r_2=2n-1$, where $r_1$ and $r_2$ are the resistivity of the higher and lower resistance portions respectively and n is the turns ratio between said lower resistance portion and the entire inductor.

7. A circuit as defined in claim 6 in which the said turns ratio approximately fulfills the relation $n=2R^2C/L$, where C and L are the capacitance and inductance of the equivalent shunt resonant circuit using a non-tapped inductor and R is the resistance of the arms of said bridge having approximately equal resistivity.

8. An amplifier circuit having envelope delay equalization capability with respect to an associated transmission facility comprising:

a. a bridge having a pair of input terminals, one of which is grounded, a first pair of arms connected in series across the input connection, both of which are resistive, a second pair of arms, likewise across the input connection, one of which is essentially resistive and connected to the input terminal which is grounded, the other containing a series resonant circuit;

b. a transistor having emitter, base and collector electrodes, the emitter electrode connected to the junction between the first pair of arms, the base electrode connected to the junction between the second pair of arms;

c. a resistor connected between a voltage source and the collector electrode;

d. the whole arranged and constructed so that when alternating signal voltages are applied across the input terminals of the bridge the transistor causes a current to flow in one arm of said first pair of arms to keep said bridge approximately balanced and thereby generates a delay equalized current at said output electrode and causes the input terminals of said bridge to present an input impedance to said transmission facility which is substantially constant over a transmission band of frequencies.

9. An amplifier circuit having envelope delay equalization capability with respect to an associated transmission facility comprising:

a. a bridge having a first pair of arms connected in series across the input connection, both of which arms are resistive, and having a second pair of arms, likewise across the input connection, one of which contains a series resonant circuit and the other of which is essentially resistive, one input corner of said bridge being grounded and said series resonant circuit being connected to the other input corner of said bridge, b. a transistor having an emitter, base and collector electrodes, the emitter electrode connected through a blocking capacitor to the junction of said first pair of arms and the base electrode connected to the junction of said second pair of arms, the arms of said first pair being lower in resistance than said essentially resistive arm of said second pair by not substantially more than the amount effective to compensate for the input impedance of the transistor and for the resistance of said series resonant circuit, c. a resistor connected between a source of voltage and the collector electrode of the transistor, d. the whole arranged and constructed so that in operation the emitter electrode and collector electrode currents of the transistor are substantially equal, the alternating component thereof flowing in substantially that one of said first pair of arms which is opposite to the arm which contains said resonant circuit.

10. A circuit as defined in claim 9 in which said resistor is included in the input to additional stages of amplification, to which the current at the collector electrode is supplied, and in which there is a feedback network connecting the output of said additional stages of amplification to the emitter electrode of said transistor in negative feedback relation and in which the source impedance of said network as a generator of feedback current functions as a parallel impedance in the arm of said bridge in which said transistor causes a current to flow.

11. A circuit as defined in claim 10 in which said additional stages of amplification and said feedback network are direct current coupled and allow the potential of said emitter of said transistor to control the no-signal current of the output stage of said additional stages.

12. A circuit as defined in claim 11 in which the no-signal potential of the base of said transistor is determined by a voltage divider including three resistors two of which, by virtue of a bypass capacitor associated therewith, are effectively in parallel to constitute one of the said second pair of arms.

* * * * *